(12) United States Patent
Krauss et al.

(10) Patent No.: US 8,617,707 B2
(45) Date of Patent: Dec. 31, 2013

(54) MAGIC SIZE NANOCLUSTERS AND METHODS OF PREPARING SAME

(75) Inventors: Todd D. Krauss, Penfield, NY (US); Christopher Evans, Rochester, NY (US); Li Guo, Rockville, MD (US); Jeffrey J. Peterson, Rochester, NY (US)

(73) Assignee: University of Rochester, Rochester, NY (US)

( * ) Notice: Subject to any disclaimer, the term of this patent is extended or adjusted under 35 U.S.C. 154(b) by 420 days.

(21) Appl. No.: 12/988,992

(22) PCT Filed: Mar. 24, 2009

(86) PCT No.: PCT/US2009/038092
§ 371 (c)(1),
(2), (4) Date: Oct. 21, 2010

(87) PCT Pub. No.: WO2009/120688
PCT Pub. Date: Oct. 1, 2009

(65) Prior Publication Data
US 2011/0052918 A1 Mar. 3, 2011

Related U.S. Application Data

(60) Provisional application No. 61/038,967, filed on Mar. 24, 2008.

(51) Int. Cl.
*B32B 5/16* (2006.01)

(52) U.S. Cl.
USPC ........... 428/402; 428/403; 427/212; 977/773; 977/774; 977/775; 977/814

(58) Field of Classification Search
USPC .................. 428/402, 403, 402.403; 427/212; 977/773, 774, 775, 814
See application file for complete search history.

(56) References Cited

U.S. PATENT DOCUMENTS

| | | | |
|---|---|---|---|
| 7,208,133 B2 * | 4/2007 | Cho et al. | 423/508 |
| 7,906,084 B2 * | 3/2011 | Mokari et al. | 423/92 |
| 2006/0061017 A1 | 3/2006 | Strouse et al. | |
| 2006/0154380 A1 | 7/2006 | Egusa et al. | |
| 2007/0254141 A1 | 11/2007 | Morse et al. | |

* cited by examiner

Primary Examiner — Leszek Kiliman
(74) Attorney, Agent, or Firm — Hodgson Russ LLP

(57) ABSTRACT

Disclosed herein are magic size nanoclusters comprising lead and one or more chalcogens. The disclosed magic size nanoclusters have both spectrally narrow fluorescence and ultrahigh quantum efficiencies. Further disclosed herein is a method for preparing PbS, PbSe, and PbTe magic size nanoclusters. The yield of magic size nanoclusters can be increased by using anion sources enriched for secondary phosphines. The use of enriched secondary phosphine anion sources also increases the yield of quantum nanostructures.

20 Claims, 6 Drawing Sheets

MAGIC SIZE NANOCLUSTERS AND METHODS OF PREPARING SAME

This application claims priority to U.S. Provisional Application No. 61/038,967, filed Mar. 24, 2008, the disclosure of which is incorporated herein by reference.

STATEMENT OF GOVERNMENT FUNDING

This invention was made with government support under Grant no. CHE-0616378 awarded by the National Science Foundation and Grant no. FA9550-04-1-0430 awarded by The Air Force Office of Scientific Research. The United States government has certain rights in the invention.

FIELD

This invention relates generally to the field of nanoparticles and more particularly to magic size nanoclusters comprising lead (Pb) and one or more chalcogens. These magic size nanoclusters have both spectrally narrow fluorescence and high photoluminescence quantum efficiencies. Further disclosed herein are processes for preparing the magic size nanoclusters.

BACKGROUND

Quantum dots and other quantum nanoparticles have been prepared and their properties have been well documented and described. One important proposed use of quantum dots, nanoparticles, and magic clusters is in the field of biochemistry wherein these particles provide photoluminescent markers for whole cells, as well as markers that allow one to track the activity of individual cellular ligands, for example, organelles or macromolecules.

One drawback of CdSe magic clusters is their low photoluminescence efficiency. The photoluminescence efficiency for CdSe magic clusters is less than 5%, and typically less than 1%. These low quantum efficiencies provide a barrier to successful tracking of individual nanoparticle/ligand complexes. In addition, the prior art nanoparticles have sizes that do not allow the particles to be easily absorbed through the cellular membrane, even in the instances wherein the particles are complexed with a substrate that easily cross the cell wall. Further limiting is the fact these particles can only be prepared in small amounts under controlled laboratory conditions, inter alia, under an inert atmosphere, at high temperatures, and using special isolation techniques.

There is now a need in the art for Pb-chalcogen (PbS, PbSe, and PbTe) magic clusters that have high photoluminescence efficiencies and that can be prepared on a large scale without the need for specialized equipment and conditions.

Advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

SUMMARY

The present invention provides magic size nanoclusters having diameters in the range of 0.5 to less than 2 nm. Also provided are compositions comprising the magic size nanoclusters. The composition comprises one or more families of MSCs. Each family of MSC has a plurality of MSCs with a majority or essentially all of the MSCs having the same size. Because the majority or essentially all of the MSCs in a family have the same size, the absorption and/or emission of a family of MSCs is observed as a narrow band. In one embodiment, the MSCs are Pb-chalcogenide MSCs having an average particle size of 0.5 to less than about 2 nanometers.

Also disclosed herein is a process for preparing magic size nanoclusters. The process comprises the steps of providing i) a source of $Pb^{2+}$; and combining the source of $Pb^{2+}$ with ii) a bis(trialkylsilyl) sulfide, a bis(triarylsilyl) sulfide, an organophosphine selenide, or organophosphine telluride, and maintaining the combination at a temperature of less than or equal to about 70 °C. This results in the formation of magic size nanoclusters.

Also disclosed herein is a method for preparing magic-sized clusters (MSCs) and/or quantum nanostructures comprising the steps of: providing a) a cation source, providing b) a composition comprising anion sources, combining a) and b); and maintaining the combination of a) and b) at a temperature and time sufficient to form the MSCs and/or QDs. The cation source is selected from the group consisting of Pb, Cd, Si, Ge, Zn, Hg, Ga, and In. The anion source comprises secondary phosphine compounds and/or secondary phosphine chalcogenide compounds selected from the group consisting of secondary phosphine selenide, secondary phosphine sulfide, secondary phosphine telluride and combinations thereof. In various embodiments, the secondary phosphine compounds and secondary phosphine chalcogenide compounds comprises at least 15% of the anion source.

BRIEF DESCRIPTION OF THE FIGURES

The accompanying drawings, which are incorporated in and constitute a part of this specification, illustrate several embodiments and together with the description illustrate the disclosed compositions and methods.

DETAILED DISCLOSURE

Figure 1:
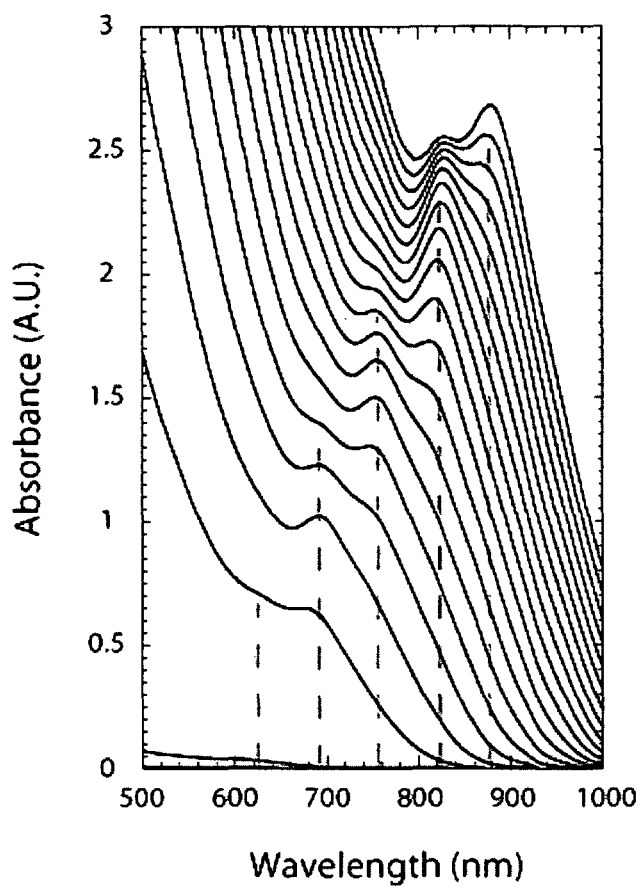
FIG. 1 depicts the absorption spectra for a MSC growth solution showing the evolution of peaks at 625, 690, 760, 820 and 880 nm.

The present invention can be understood more readily by reference to the following detailed description of the invention and the Examples included therein.

Before the present compounds, compositions, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention.

Further, the dates of publication provided herein can be different from the actual publication dates, which can need to be independently confirmed.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed, then "less than or equal to" the value, "greater than or equal to the value," and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

"Magic size" or "Magic sized" nanoclusters or clusters are used interchangeably throughout the disclosure to describe the lead (Pb) chalcogenide near infrared emitting compositions having a diameter of less than equal to about 2 nanometers and are abbreviated herein as MSCs. These magic size nanoclusters can be prepared by the processes described herein. The compositions comprising the MSCs can comprise one or more adjunct ingredients or biological components.

As used herein, the terms "source of $Pb^{2+}$" and "$Pb^{2+}$ source" refer to a chemical species capable of providing $Pb^{2+}$ ions or inorganic species containing $Pb^{2+}$ atoms. Without wishing to be bound by theory, it is contemplated that certain compounds containing $Pb^{2+}$ can undergo reaction(s) that convert $Pb^{2+}$ to $Pb^0$ before being re-converted to $Pb^{2+}$. Suitable examples of sources of $Pb^{2+}$ include lead carboxylates (e.g., lead acetate, lead oleate, lead propanoate, lead butanoate, lead pentanoate, lead hexanoate, lead heptanoate, lead octanoate, lead nonanoate, lead decanoate, lead undecanoate, lead dodecanoate, lead tridecanoate, lead tetradecanoate, lead pentadecanoate, lead spalmitoate, lead arachidoate, lead stearate, lead erucate, lead aracidonate, lead linooleate, and lead linoleinate) and lead oxide. One of skill in the art will readily recognize a source of $Pb^{2+}$.

The term "mono-dispersed" is used herein with respect to a "family" of MSCs to describe MSC sizes in each family. A MSC family is used herein to describe a specific cluster composition characterized by a specific size, geometric structure, and electronic structure. Due to the monodisperse characteristic, a family of MSCs has spectrally narrow absorbance and/or photoluminescence bands relative to quantum dots of the same material. While quantum dots have a well-defined distribution of sizes, and thus absorb/emit over a range of wavelengths corresponding to those sizes, each family of MSCs comprises MSCs characterized by an identical absorption energy. Thus, while the lineshape of quantum dots is inhomogeneously broadened (i.e., it is determined by the distribution function describing the sizes of the ensemble rather than an individual member), all MSCs in a family have an essentially identical lineshape. Because of the well-defined distribution of sizes of quantum dots, no distinct families can be identified in a composition of quantum dots. The portion of MSCs in a family different in size from the mode of the MSCs in the family do not detectibly contribute to the absorption and/or emission spectra observed for each MSC family. For example, if 90% of the MSCs in a family have the same size (the mode), the remaining 10% do not detectibly contribute to the lineshape.

A majority or essentially all of the MSCs in a family are the same size. The size of the MSCs in any family is the mode (the most commonly represented size) of the all MSCs giving rise to a discrete narrow absorption and/or emission band. In various embodiments, at least 80, 85, 90, 95, 99%, or 100% (and all percentages between 80 and 100%) of the MSCs in a family are the same size.

The present magic size nanoclusters (MSCs) have spectrally narrow fluorescence, as well as high quantum efficiency. The spectral fluorescence of a family of MSCs is narrow and is essentially identical to the fluorescence expected from a single MSC of the modal size of the family. Also, PbSe MSCs have a narrower fluorescence emission that PbSe QDs. The MSCs have a photoluminescent efficiency of between about 10% and about 100%, while in one embodiment the photoluminescent efficiency is greater than 50%. A further embodiment has MSCs with a photoluminescent efficiency that is greater than 70%. In a still further embodiment, the MSCs have a photoluminescent efficiency greater than 90%.

The present compositions comprise distinct families of mono-disperse MSC nanoclusters. Without intending to be bound by any particular theory, it is considered that the mono-dispersity is achieved by controlling the conditions of the preparation process such that Ostwald ripening either does not occur or is minimal. Each family of MSCs disclosed herein has a particle size distribution whose mode is 0.5 to less than 2 nm. In one embodiment, each family has a particle size distribution whose mode is 0.5 to 1.75 nm. In another embodiment, each family has a particle size distribution whose mode is 0.5 to 1.5 nm. In another embodiment, each family has a particle size distribution whose mode is 0.5 to 1.0 nm. In another embodiment, each family has a particle size distribution whose mode 0.5 nm. In one embodiment, all of the MSCs in a composition are from 0.5 to less than 2.0 nm.

In various embodiments, the size of greater than 50, 60, 70, 75, 80, 85, 90, 95, 98, or 99%, or 100%, of the MSCs within a family is identical to the mode of the family which is within the range of from 0.9 nm to 1.9 nm. In various other embodiments, the size of greater than 50, 60, 70, 75, 80, 85, 90, 95, 98, or 99%, or 100%, of the MSCs in a family is identical to the mode of the family which is within the range of from 0.5 nm to 1.5 nm.

The disclosed MSC nanoclusters, because they comprise Pb, have large exciton Bohr radii compared with Cd-based quantum nanoparticles, especially the cadmium-chalcogen quantum nanoparticles; CdS, CdSe, and CdTe. In addition, the disclosed MSCs emit near infrared light at wavelengths from about 700-1200 nm. The near infrared emission, together with the small average particle size, allows the disclosed MSCs to be used as biological probes because the near infrared emissions are not well absorbed by surrounding biological tissue or fluids.

The shape of the MSCs of the present invention can be spherical. The shape of the MSCs can also be other than spherical, for example, the MSCs can be "tablet-shaped" similar to a common pill. The MSCs can also be ovoid, ellipsoid, nonspheriods (e.g. cubes and other box shapes), caged structures as well (e.g. fullerenes) or have an irregular shape.

The disclosed MSCs provide a method for detecting, tracking, analyzing, modifying, and otherwise studying biological processes in vivo, in vitro, and ex vivo.

PROCESS

The step of the process comprises providing a source of $Pb^{2+}$. The source of $Pb^{2+}$ can be any source either active or inactive. By the term "active source of $Pb^{2+}$" is meant, a source of lead that is in the form of a reactive species, for example, as a lead complex. A non-limiting example of an inactive source of $Pb^{2+}$ is lead oxide PbO.

In one embodiment, the source of lead is a $Pb^{2+}$-dispersant complex (e.g., a mixture of PbO or Pb-acetate and a carboxylic acid) wherein the dispersant is a substituted or unsubstituted linear, saturated or unsaturated $C_{12}$-$C_{22}$ carboxylic acid. One iteration of this embodiment includes the following non-limiting examples of $Pb^{2+}$-dispersant complexes: $Pb^{2+}$-dodecanoic acid (lauric acid), $Pb^{2+}$-$\Delta^2$-dodecenoic acid, $Pb^{2+}$-tridecanoic acid (lauric acid), $Pb^{2+}$-tetradecanoic acid (myristic acid), $Pb^{2+}$-(Z)-$\Delta^9$-tetradecenoic acid, $Pb^{2+}$-pentadecanoic acid, $Pb^{2+}$-hexadecanoic acid (palmitic acid), $Pb^{2+}$-(Z)-$\Delta^9$-hexadecenoic acid, $Pb^{2+}$-octadecanoic acid (stearic acid), $Pb^{2+}$-(Z)-$\Delta^9$-octadecenoic acid (oleic acid), $Pb^{2+}$-(Z,Z)-$\Delta^{9,12}$-octadecadienoic acid (linoleic acid), $Pb^{2+}$-(Z,Z,Z)-$\Delta^{9,12,15}$-octadecatrienoic acid (linolenic acid), $Pb^{2+}$-(Z)-$\Delta^{11}$-eicosenoic acid, $Pb^{2+}$-(Z,Z,Z)-$\Delta^{5,8,11}$-eicosatrienoic acid (mead acid), and $Pb^{2+}$-(Z)-$\Delta^{13}$-docosenoic acid (erucic acid). In another iteration, the dispersant is selected from lauric acid, palmitic acid, stearic acid, linoleic acid, and linolenic acid. In a further iteration, the dispersant is oleic acid.

In a yet further embodiment, the dispersant is a substituted linear, saturated or unsaturated $C_1$-$C_{11}$ carboxylic acid. One iteration of this embodiment includes the following non-limiting examples of $Pb^{2+}$-dispersant complexes: $Pb^{2+}$-acetic acid, $Pb^{2+}$-propionic acid, $Pb^{2+}$-butyric acid, $Pb^{2+}$-pentanoic acid, $Pb^{2+}$-hexanoic acid, $Pb^{2+}$-2-ethylhexanoic acid, $Pb^{2+}$-heptanoic acid, $Pb^{2+}$-octanoic acid, $Pb^{2+}$-nonanoic acid, $Pb^{2+}$-decanoic acid, and $Pb^{2+}$-undecanoic acid.

In a further embodiment, the source of $Pb^{2+}$ is lead (II) oxide, lead (II) azide, lead (II) bromide, lead (II) carbonate, lead (II) chloride, lead (II) chromate, lead (II) fluoride, lead (II) hydroxide, lead (II) iodide, lead (II) nitrate, and the like.

In one iteration of the first step, the source of $Pb^{2+}$ can be provided in a non-coordinating solvent. Non-limiting examples of non-coordinating solvents include 1-decene, 1-dodecene, 1-tetradecene, 1-hexadecene, 1-octadecene, 1-icosene, and 1-docosene. In a further iteration of step (a), when the source of $Pb^{2+}$ is a $Pb^{2+}$-dispersant complex, the non-coordinating solvent is chosen from a solvent having a similar length alkyl, alkenyl, or alkynyl chains. For example, $Pb^{2+}$-(Z)-$\Delta^9$-octadecenoic acid (oleic acid) as the source of $Pb^{2+}$ and 1-octadecene as the non-coordinating solvent.

The source of $Pb^{2+}$ can be provided at any temperature that is compatible with a reaction temperature of less than or equal to about 70° C. For example, if step (c) is conducted at a temperature of 50° C., then the source of $Pb^{2+}$ can be provided at a temperature of 50° C.

The second step of the process comprises combining the source of $Pb^{2+}$ with a bis(tri-alkylsilyl) sulfide, a bis(tri-arylsilyl) sulfide, a bis(di-alkyl-mono-arylsilyl) sulfide, a bis (mono-alkyl-di-arylsilyl) sulfide, organophosphine sulfide, organophosphine selenide, or organophosphine telluride.

One embodiment of this step relates to combining the source of $Pb^{2+}$ with a bis(trialkylsilyl) sulfide, for example, bis(trimethylsilyl) sulfide. The ratio of the source of $Pb^{2+}$ to bis(trialkylsilyl) sulfide can be from 10 equivalents of a source of $Pb^{2+}$ to 1 equivalent of bis(trialkylsilyl) sulfide (10:1) to 1 equivalent of a source of $Pb^{2+}$ to 10 equivalents of bistrimethylsilyl sulfide (1:10). In one embodiment, the ratio of the source of $Pb^{2+}$ to bis(trialkylsilyl) sulfide is from about (1:1) to about (1:5). In another embodiment, the ratio of the source of $Pb^{2+}$ to bis(trialkylsilyl) sulfide is from about (1:1) to about (1:3). In a further embodiment, the ratio of the source of $Pb^{2+}$ to bis(trialkylsilyl) sulfide is from about (1:1) to about (1:2). In a yet further embodiment, the ratio of the source of $Pb^{2+}$ to bis(trialkylsilyl) sulfide is from about (1:1) to about (1:1.5). In a yet another embodiment, the ratio of the source of $Pb^{2+}$ to bis(trialkylsilyl) sulfide is about (1:1). In still further embodiment, the ratio of the source of $Pb^{2+}$ to bis(trialkylsilyl) sulfide is from about (5:1) to about (1:1). In a yet still another embodiment of, the ratio of the source of $Pb^{2+}$ to bis(trialkylsilyl) sulfide is from about (3:1) to about (1:1). In a yet still further embodiment, the ratio of the source of $Pb^{2+}$ to bis(trialkylsilyl) sulfide is from about (2:1) to about (1:1).

However, the formulator can adjust the ratio of reagents predicated on the conditions of the reaction, for example, while monitoring the course of MSC nanocluster formation, the formulator can adjust the temperature and therefore change the conditions, course of final MSC nanocluster size and yield. One of the advantages of the disclosed processes is that the processes can be scaled up to include volumes in excess of laboratory scale, for example, up to 1,000 mL volume In the course of scale up, the formulator can determine the ratio of reagents in step (b) predicated on the course of MSC nanocluster formation.

This embodiment can be conducted in the presence of a non-coordinating solvent. Non-limiting examples of non-coordinating solvents include 1-decene, 1-dodecene, 1-tetradecene, 1-hexadecene, 1-octadecene, 1-icosene, and 1-docosene. The source of the non-coordinating solvent can come from the source of $Pb^{2+}$ provided in the first step. The non-coordinating solvent can be added to, for example, bis(trimethylsilyl) sulfide. When a non-coordinating solvent is used in step (a) the same or different non-coordinating solvent can be combined with bis(trimethylsilyl) sulfide prior to combining the source of $Pb^{2+}$ with the bis(trimethylsilyl) sulfide. However, during the course of forming the MSC nanoclusters, the formulator can add an additional amount of one or more non-coordinating solvents.

One embodiment of the second step relates to combining the source of $Pb^{2+}$ with an organophosphine sulfide. The organophosphine sulfide can be any organophosphine sulfide. In one embodiment, the organophosphine sulfide can be a trialkylphosphine sulfide. One iteration of this embodiment relates to the $C_1$-$C_{12}$ tri-n-alkylphosphine sulfide, non-limiting examples of which include trimethylphosphine sulfide, triethylphosphine sulfide, tripropylphosphine sulfide, tributylphosphine sulfide, tripentylphosphine sulfide, trihexylphosphine sulfide, triheptylphosphine sulfide, trioctylphosphine sulfide, trinonylphosphine sulfide, tridecylphosphine sulfide, triundecylphosphine sulfide, and tridodecylphosphine sulfide.

In various embodiments the organophosphine sulfide (e.g., RR'R'''P=S) has R groups which can independently be alkyl, alkoxy, cyclic, or aryl.

A yet further iteration of this embodiment relates to the substituted and unsubstituted triarylphosphine sulfides. Non-limiting examples of this embodiment include triphenylphosphine sulfide, tri-(4-methylphenyl)phosphine sulfide, tri-(3-chlorophenyl)phosphine sulfide, and the like. A yet still further iteration of this embodiment relates to the trialkylenearylphosphine sulfides, for example, tribenzylphosphine sulfide.

Another embodiment of the second step relates to combining the source of $Pb^{2+}$ with an organophosphine selenide. The organophosphine selenide can be any organophosphine selenide. In one embodiment, the organophosphine selenide can be a trialkylphosphine selenide. One iteration of this embodiment relates to the $C_1$-$C_{12}$ tri-n-alkylphosphine selenides, non-limiting examples of which include trimethylphosphine selenide, triethylphosphine selenide, tripropylphosphine selenide, tributylphosphine selenide, tripentylphosphine selenide, trihexylphosphine selenide, triheptylphosphine selenide, trioctylphosphine selenide, trinonylphosphine selenide, tridecylphosphine selenide, triundecylphosphine selenide, and tridodecylphosphine selenide.

A further iteration of this embodiment relates to the $C_1$-$C_{12}$ mono/di-alkylphosphine selenides. Non-limiting examples of this embodiment include methyl-dioctylphosphine selenide, butyl-dioctylphosphine selenide, and hexyl-dioctylphosphine selenide.

In yet further iteration of this embodiment the organophosphine selenide is bis(trimethylsilyl)sulfide, tripropylphosphine sulfide, tributylphosphine sulfide, tripentylphosphine sulfide, trihexylphosphine sulfide, triheptylphosphine sulfide, trioctylphosphine sulfide, tripropylphosphine selenide, tributylphosphine selenide, tripentylphosphine selenide, trihexylphosphine selenide, triheptylphosphine selenide, trioctylphosphine selenide, tripropylphosphine telluride, tributylphosphine telluride, tripentylphosphine telluride, trihexylphosphine telluride, triheptylphosphine telluride, trioctylphosphine telluride and all potential alkyl-isomers thereof.

A yet further iteration of this embodiment relates to the substituted and unsubstituted triarylphosphine selenides. Non-limiting examples of this embodiment include triphenylphosphine selenide, tri-(4-methylphenyl)phosphine selenide, tri-(3-chlorophenyl)phosphine selenide, and the like. A yet still further iteration of this embodiment relates to the trialkylenearylphosphine selenides, for example, tribenzylphosphine selenide.

In various embodiments the organophosphine selenide (e.g., RR'R'''P=Se) has R groups which can independently be alkyl, alkoxy, cyclic, or aryl.

The ratio of the source of $Pb^{2+}$ to the organophosphine selenide can be from 10 equivalents of a source of $Pb^{2+}$ to 1 equivalent of the organophosphine selenide (10:1) to 1equivalent of a source of $Pb^{2+}$ to 10 equivalents of the organophosphine selenide (1:10). In one embodiment of the second step, the ratio of the source of $Pb^{2+}$ to the organophosphine selenide is from about (1:1) to about (1:5). In another embodiment of the second step, the ratio of the source of $Pb^{2+}$ to the organophosphine selenide is from about (1:1) to about (1:3). In a further embodiment of the second step, the ratio of the source of $Pb^{2+}$ to the organophosphine selenide is from about (1:1) to about (1:2). In a yet further embodiment of the second step, the ratio of the source of $Pb^{2+}$ to the organophosphine selenide is from about (1:1) to about (1:1.5). In a yet another embodiment of the second step, the ratio of the source of $Pb^{2+}$ to the organophosphine selenide is about (1:1). In still further embodiment of the second step, the ratio of the source of $Pb^{2+}$ to the organophosphine selenide is from about (5:1) to about (1:1). In a yet still another embodiment of the second step, the ratio of the source of $Pb^{2+}$ to the organophosphine selenide is from about (3:1) to about (1:1). In a yet still further embodiment of the second step, the ratio of the source of $Pb^{2+}$ to the organophosphine selenide is from about (2:1) to about (1:1).

However, the formulator can adjust the ratio of reagents predicated on the conditions of the reaction, for example, while monitoring the course of MSC nanocluster formation, the formulator can adjust the temperature and therefore change the conditions, course of final MSC nanocluster size and yield. One of the advantages of the disclosed processes is that the processes can be scaled up large volumes, for example, 1,000 mL and above. In the course of scale up, the formulator can determine the ratio of reagents in this step predicated on the course of nanoparticle formation.

This embodiment of the second step can be conducted in the presence of a non-coordinating solvent. Non-limiting examples of non-coordinating solvents include 1-decene, 1-dodecene, 1-tetradecene, 1-hexadecene, 1-octadecene, 1-icosene, and 1-docosene. The source of the non-coordinating solvent can come from the source of $Pb^{2+}$ provided in the first step. The non-coordinating solvent can be added to the organophosphine selenide. When a non-coordinating solvent is used in the first step the same or different non-coordinating solvent can be combined with the organophosphine selenide prior to combining the source of $Pb^{2+}$ with the organophosphine selenide. However, during the course of forming the MSC nanocluster, the formulator can add an additional amount of one or more non-coordinating solvents.

A further embodiment of the second step relates to combining the source of $Pb^{2+}$ with an organophosphine telluride. The organophosphine telluride can be any organophosphine telluride. In one embodiment, the organophosphine telluride can be a trialkylphosphine telluride. One iteration of this embodiment relates to the $C_1$-$C_{12}$ tri-n-alkylphosphine tellurides, non-limiting examples of which include trimethylphosphine telluride, trimethylphosphine telluride, triethylphosphine telluride, tripropylphosphine telluride, tributylphosphine telluride, tripentylphosphine telluride, trihexylphosphine telluride, triheptylphosphine telluride, trioctylphosphine telluride, trinonylphosphine telluride, tridecylphosphine telluride, triundecylphosphine telluride, and tridodecylphosphine telluride.

A further iteration of this embodiment relates to the $C_1$-$C_{12}$ mono/di-alkylphosphine tellurides. Non-limiting examples of this embodiment include methyl-dioctylphosphine telluride, butyl-dioctylphosphine telluride, and hexyl-dioctylphosphine telluride.

A yet further iteration of this embodiment relates to the substituted and unsubstituted triarylphosphine tellurides. Non-limiting examples of this embodiment include triphenylphosphine telluride, tri-(4-methylphenyl)phosphine telluride, tri-(3-chlorophenyl)phosphine telluride, and the like. A yet still further iteration of this embodiment relates to the trialkylenearylphosphine tellurides, for example, tribenzylphosphine telluride.

In various embodiments the organophosphine telluride (e.g., RR'R'''P=Te) has R groups which can independently be alkyl, alkoxy, cyclic, or aryl.

The ratio of the source of $Pb^{2+}$ to the organophosphine telluride can be from 10 equivalents of a source of $Pb^{2+}$ to 1 equivalent of the organophosphine telluride (10:1) to 1 equivalent of a source of $Pb^{2+}$ to 10 equivalents of the organophosphine telluride (1:10). In one embodiment of the second step, the ratio of the source of $Pb^{2+}$ to the organophosphine telluride is from about (1:1) to about (1:5). In another embodiment of the second step, the ratio of the source of $Pb^{2+}$ to the organophosphine telluride is from about (1:1) to about (1:3).

In a further embodiment of the second step, the ratio of the source of $Pb^{2+}$ to the organophosphine telluride is from about (1:1) to about (1:2). In a yet further embodiment of the second step, the ratio of the source of $Pb^{2+}$ to the organophosphine telluride is from about (1:1) to about (1:1.5). In a yet another embodiment of the second step, the ratio of the source of $Pb^{2+}$ to the organophosphine telluride is about (1:1). In still further embodiment of the second step, the ratio of the source of $Pb^{2+}$ to the organophosphine telluride is from about (5:1) to about (1:1). In a yet still another embodiment of the second step, the ratio of the source of $Pb^{2+}$ to the organophosphine telluride is from about (3:1) to about (1:1). In a yet still further embodiment of the second step, the ratio of the source of $Pb^{2+}$ to the organophosphine telluride is from about (2:1) to about (1:1).

However, the formulator can adjust the ratio of reagents predicated on the conditions of the reaction, for example, while monitoring the course of MSC nanocluster formation, the formulator can adjust the temperature and therefore change the conditions, course of final MSC nanocluster size and yield.

This embodiment of the second step can be conducted in the presence of a non-coordinating solvent. Non-limiting examples of non-coordinating solvents include 1-decene, 1-dodecene, 1-tetradecene, 1-hexadecene, 1-octadecene, 1-icosene, and 1-docosene. The source of the non-coordinating solvent can come from the source of $Pb^{2+}$ provided in the first step. The non-coordinating solvent can be added to the organophosphine telluride. When a non-coordinating solvent is used in the first step the same or different non-coordinating solvent can be combined with the organophosphine telluride prior to combining the source of $Pb^{2+}$ with the organophosphine telluride. However, during the course of forming the MSC nanoclusters, the formulator can add an additional amount of one or more non-coordinating solvents.

In the next step of the method, the combination of Pb source and anion source selected from selected from the group consisting of bis(trialkylsilyl) sulfide, bis(triarylsilyl) sulfide, bis(di-alkyl-mono-arylsilyl) sulfide, bis(mono-alkyl-di-arylsilyl) sulfide an organophosphine selenide, and organophosphine telluride, are maintained at a temperature of less than about 70° C. thereby forming magic size nanoclusters.

In one embodiment, the temperature can be from about 20° C. to about 70° C. In another embodiment, the temperature can be from about 20° C. to about 50° C. In a further embodiment, the temperature can be from about 30° C. to about 70° C. In a yet further embodiment, the temperature can be from about 30° C. to about 50° C.

In a still further embodiment, the temperature can be less than about 50° C. In a yet another embodiment, the temperature can be less than about 40° C. However, the temperature of step (c) can have any discrete temperature value between 20° C. and 70° C., for example, 70° C., 69° C., 68° C., 67° C., 66° C., 65° C., 64° C., 63° C., 62° C., 61° C., 60° C., 59° C., 58° C., 57° C., 56° C., 55° C., 54° C., 53° C., 52° C., 51° C., 50° C., 49° C., 48° C., 47° C., 46° C., 45° C., 44° C., 43° C., 42° C., 41° C., 40° C., and the like.

In one embodiment, as a result of the relatively low temperatures used in the present method, common organic solvents can be used in any of the steps of the process. The relatively high temperatures used in the prior art (e.g., 300° C.) required use of high boiling point solvents. Examples of common solvents include, but are not limited to, pentane, hexane, heptane, cyclohexane, benzene, toluene, xylene, chloroform, methylene chloride, acetonitrile, and dimethylformamide.

The reagents used to form the disclosed MSC nanoclusters can be combined in any order, for example, the source of $Pb^{2+}$ can be added to the silyl sulfide, the organophosphine selenide, or the organophosphine telluride, or alternatively, the silyl sulfide, the organophosphine selenide, or the organophosphine telluride can be added to the source of $Pb^{2+}$. In addition, the reagents can be at the same temperature or at any temperature of less than or equal to about 70° C. For example, the source of $Pb^{2+}$ can be at a first temperature and the organophosphine selenide can be at a second different temperature.

Both of first two steps of the disclosed process can further comprise a particle growth, nucleation stabilization system (PGNSS). In one aspect, the PGNSS comprises an alkyl amine, for example, an alkyl amine chosen from octylamine, nonylamine, decylamine, undecylamine, dodecylamine (laurylamine), tridecylamine, tetradecylamine (myristyl amine), pentadecylamine, hexadecylamine (palmitylamine), septadecylamine, octadecylamine, and the like. In addition, unsaturated amines can be used in this aspect, for example, an amine chosen from $\Delta^2$-dodecenylamine, (Z)-$\Delta^9$-tetradecenylamine, (Z)-$\Delta^9$-hexadecenylamine, (Z)-$\Delta^9$-octadecenylamine (oleylamine), (Z,Z)-$\Delta^{9,12}$-octadecadienylamine (linoleylamine), (Z,Z,Z)-$\Delta^{9,12,15}$-octadecatrienylamine (linolenylamine), (Z)-$\Delta^{11}$-eicosenylamine, (Z,Z,Z)$\Delta^{5,8,11}$-eicosatrienylamine, and (Z)-$\Delta^{13}$-docosenylamine.

The disclosed process can be preformed without the need of an inert atmosphere. However, in one embodiment the second step is conducted under an inert atmosphere utilizing nitrogen, argon, or any other dry inert gas.

The disclosed process can further comprise an optional step comprising isolating the magic size nanoclusters. The MSC nanoclusters can be isolated by any method available to the formulator. In one embodiment, the MSC nanoclusters are isolated by filtration. In another embodiment, the MSC nanoclusters are isolated by centrifugation. As described herein the MSC nanoclusters once isolated, can be characterized and modified for use as biological conjugate.

The MSCs formed by the disclosed process may have a passivation layer surrounding the outside surface of the clusters. The passivation layer helps to stabilize the MSC nanoclusters. The MSC nanoclusters can be modified to be hydrophilic by exchange of the original passivation layer with one that provides water solubility or water dispersability.

Figure 2:
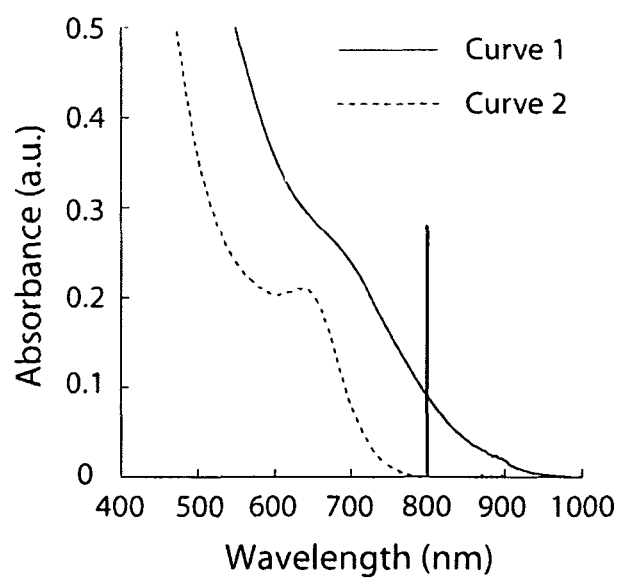
FIG. 2 depicts the absorption spectra for a MSC growth solution showing before and after photobleaching at 800 nm. Photobleaching of one cluster size does not affect the smaller clusters that do not absorb the light at 800 nm.
Figure 3:
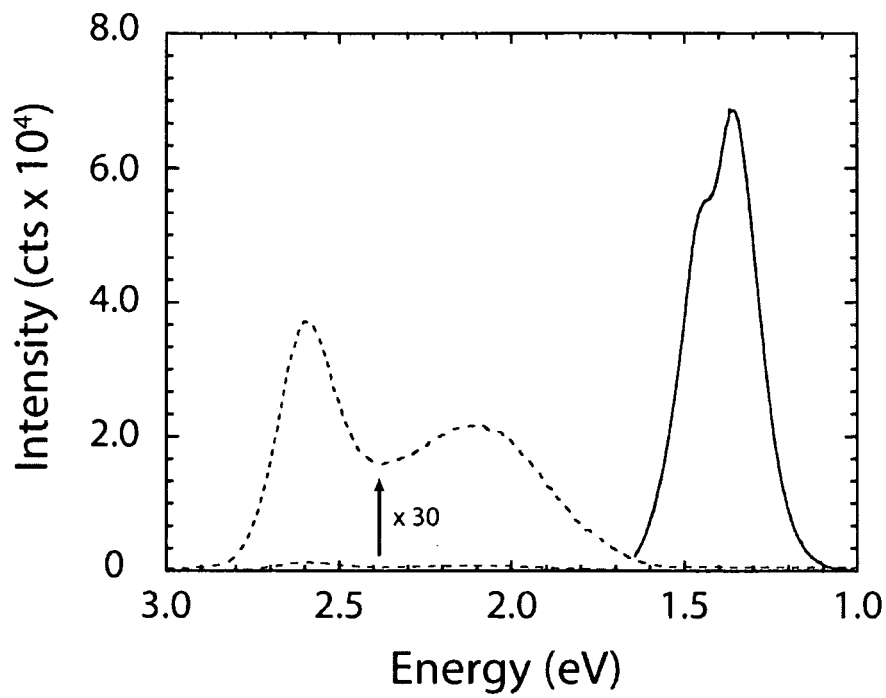
FIG. 3 depicts a comparison of the emission spectra of CdSe (dashed) and PbSe (solid) magic-sized clusters having identical absorption cross-sections.

FIG. 1 and FIG. 2 depict the spectra for PbSe magic size nanoclusters growth solution wherein the absorption maxima of the emission peaks at 625, 690, 760, 820 and 880 nm (FIGS. 1 and 8) are not dependent on growth time. Unlike PbSe nanoparticles that have been grown at higher temperatures, the disclosed MSC nanoclusters, as the course of MSC nanocluster formation proceeds, the ratio of the five absorption peaks changes in a manner that favors a lower energy component at long reaction times. Rather than growing in a bulk-like manner with heterogeneous diameter distributions, the present process provides for several stable MSC nanocluster sizes. FIG. 3 depicts a comparison of the emission spectra of CdSe (dashed) and PbSe (solid) magic-sized clusters having identical absorption cross-sections. The emission peak for the PbSe MSCs calculated from the peak in FIG. 3 is 920 nm.

Along the surface of the core can exist one or more compounds that define the hydrodynamic diameter and which act to influence the ability of the MSCs to function as either a biological probe or to facilitate entry of the nanoparticle into a cellular structure. This layer is otherwise known as a "passification layer." The passification layer can comprise any material that acts to stabilize the nanoparticles or that serves as a point of attachment of one or more biological analytes, biologically active substrates, or biologically compatible agents. Non-limiting example include $C_1$-$C_{22}$ carboxylic acids, $C_6$-$C_{22}$ alkyl amines, trialkyl-phosphonic acid, trialkyl-phosphine oxides, and trialkyl-phosphines.

In one embodiment, the passification layer comprises a $C_{12}$-$C_{22}$ carboxylic acid. In one iteration of this embodiment, the layer comprises a carboxylic acid chosen from hexadecanoic acid (palmitic acid), octadecanoic acid (stearic acid), (Z)-$\Delta^9$-octadecenoic acid (oleic acid), (Z,Z)-$\Delta^{9,12}$-octadecadienoic acid (linolenic acid), (Z,Z,Z)-$\Delta^{9,12,15}$-octadecatrienoic acid (linolenic acid). In another iteration, the layer comprises a $C_1$-$C_{11}$ carboxylic acid chosen from octanoic acid, nonanoic acid, decanoic acid, undecanoic acid, dodecanoic acid (lauric acid), tridecanoic acid, tetradecanoic acid (myristic acid), pentadecanoic acid, hexadecanoic acid (palmitic acid), septadecanoic acid, octadecanoic acid (stearic acid), (Z)-$\Delta^9$-octadecenoic acid (oleic acid), (Z,Z)-$\Delta^{9,12}$-octadecadienoic acid (linolenic acid), (Z,Z,Z)-$\Delta^{9,12,15}$-octadecatrienoic acid (linolenic acid), For example, the MSCs formed in Example 3 herein comprise an outer coating of oleic acid. This coating can comprise more or less of oleic acid depending upon the amount of oleic acid that is present during the process. The coating can be adjusted by the formulator in order to form a coating compatible with the intended use of the nanoparticles, for example, as an adduct for biological screening such as a cellular probe.

In the preparation of the MSCs using organophosphines, it was surprisingly observed that the secondary phosphine was the reactive species for the preparation of the MSCs and quantum nanostructures. Typically, the secondary phosphine is a minor component in commercially available tertiary phosphine preparations generally used in the preparation of quantum dots and other nanostructures. By using an anion source containing a high percentage of secondary phosphine, it was also surprisingly observed that quantum dots could be produced at a significantly higher efficiency at lower temperatures (e.g. 70° C.) than by previously known methods. Therefore, by using anion sources comprising a high percentage of secondary phosphines, the yield of MSCs, quantum dots, and other quantum nanostructures can be increased.

Quantum nanostructures as used herein includes, but is not limited to, quantum dots, quantum rods, quantum wires, dendridic inorganic nanostructures, tetrapods, cubes, core-shell and alloy structures of the preceding, and the like. Quantum nanostructures include any 3-D geometry whereby one or more dimensions is of such size to be considered quantum confined. For semiconductors, quantum confinement is based upon the inherent exciton Bohr radii of the constituent atoms.

Quantum dots that can be prepared by the present method using secondary phosphines include, but are not limited to, cores, core-shells, alloyed cores, and alloyed core-shells, and the like. Any quantum nanostructure structure which is produced using an organophosphine-chalcogenide compound (e.g. TOP-Se) can be formed using the present method.

Thus, in one embodiment, this invention provides a process for preparing magic-sized clusters (MSCs) and/or quantum nanostructures comprising the steps of: providing a) a cation source, providing b) a composition comprising anion sources, combining a) and b); and maintaining the combination of a) and b) at a temperature and time sufficient to form the MSCs and/or QDs. The cation source is selected from the group consisting of Pb, Cd, Si, Ge, Zn, Hg, Ga, and In. The anion source comprises one or more secondary phosphine compounds. In various embodiments, the secondary phosphine compounds comprises greater than 15, 20, 25, 50, 75, 80, 90, 95 or 99%, or 100%, of the anion source. In various other embodiments, the secondary phosphine compounds comprises from 10 to 100% and all integers in between of the anion source.

The cation source is any Pb, Cd, Si, Ge, Zn, Hg, Ga, or In compound that can react with a secondary phosphine chalcogenide to form a MSC or quantum nanostructure. Examples of such compounds include carboxylates, halides, carbonates and oxalates of the above.

The anion source reacts with the cation source to form MSCs and/or quantum nanostructures. The anion source can comprise a secondary phosphine and/or a secondary phosphine chalcogenide compound.

Secondary phosphines useful in the present invention have the general formula R(R')PH. The R and R' groups can independently be n-alkyl and isomers thereof (e.g. iso-butyl, sec-butyl, tert-butyl), and aryl or alkyl groups. Secondary phosphites of the general formula ((R"O)(R'"O)PH) can also be used. The R" and R'" groups can independently be n-alkyl and isomers thereof (e.g. iso-butyl, sec-butyl, tert-butyl), and aryl or alkyl groups.

Examples of secondary monophosphine compounds include, bis(3,5-bis(trimethylsilyl)phenyl)phosphine, bis(4-chlorophenyl)phosphine, bis(3,5-di-tert-butylphenyl)phosphine, bis(3,5-ditrifluoromethylphenyl)phosphine, bis(2-furyl)phosphine, bis(4-methylphenyl)phosphine, 1,2-bis(phenylphosphino)ethane, 1,3-bis(phenylphosphino)propane, bis(4-trifluoromethylphenyl)phosphine, bis(3,4,5-trimethoxyphenyl)phosphine, bis(2,4,6-trimethylphenyl)phosphine, dibenzylphosphine, di-n-butylphosphine, di-tert-butylphosphine, dicyclohexylphosphine, diisobutylphosphine, diisopropylphosphine, diphenylphosphine, phobane, di-2-norbornylphosphine, diethylphosphine, dicyclopentylphosphine, dicyclohexylphosphine, di-t-butylphosphine, di-n-propylphosphine, di-1-adamantylphosphine, 1,3-bis(isopropylphosphino)propane, bis(3,5-dimethylphenyl)phosphine, di-n-octylphosphine, di-n-hexylphosphine, di-n-heptylphosphine, di-n-propylphosphine.

The secondary phosphines can be reacted with a chalcogen (S, Se, Te) source (e.g. sulfur, selenium, tellurium, or compounds thereof) to form secondary phosphine chalcogenide compounds, such as secondary phosphine selenide, secondary phosphine sulfide, secondary phosphine telluride compounds. These compounds are air stable. In one embodiment, a secondary phosphine chalcogenide compound selected from the group consisting of secondary phosphine selenide, secondary phosphine sulfide, secondary phosphine telluride, secondary phosphine arsenide, secondary phosphine antimonide and combinations thereof can be reacted with a cation to form MSCs or quantum nanostructures.

The secondary phosphines may form diphosphines, which in turn can also react with the cation sources to form MSCs and quantum nanostructures. Suitable diphosphines have the general formula (RR'R'"P-P""R""R"""). Examples of disphosphine compounds include, but are not limited to, tetraphenylbisphosphine.

In one embodiment, the anion source comprises secondary arsine (R(R')AsH) compounds and secondary antimony compounds (R(R')SbH). Examples of these compounds include the As and Sb analogs to the secondary phosphines discussed above.

In one embodiment, as a result of the relatively low temperatures used in the present method common organic solvents can be used in any of the steps of the process. The relatively high temperatures used in the prior art (e.g., 300° C.) required use of high boiling point solvents. Examples of common solvents include, but are not limited to, pentane, hexane, heptane, cyclohexane, benzene, toluene, xylene, chloroform, methylene chloride, acetonitrile, and dimethylformamide.

Without intending to be bound by any particular theory, it is considered that secondary phosphines and/or tertiary phosphines can react with compounds other than elemental chalcogens to produce a secondary phosphine chalcogenide. Rapid Se transfer is observable between tertiary phosphines and secondary phosphines. Furthermore, intramolecular reactions/rearrangements can occur in biphosphine chalcogenides or diphosphine chalcogenide complexes (e.g., DIPPE) to produce a new chalcogenide. Thermodynamically the most basic phosphorus is favored but kinetically others can exist in equilibrium. In essence, the mere addition of a secondary phosphine to any phosphine-chalcogenide combination produces some amount of secondary phosphine chalcogenide (the exchange may be too fast to observe at room temperature) and thereby increase the rate of MSC or quantum nanostructure formation. Furthermore, it is important to note that adding DPP to a reaction with a borane coordinated to the phosphorus still may provide some reactivity. So, any secondary phosphine that is mentioned can also have a borane adduct.

The present method requires lower temperatures because of the increased reactivity of the secondary phosphine based anion sources. Reactions using secondary phosphine based anion sources can be run at significantly lower temperature than corresponding reactions using tertiary phosphine based anion sources. For example, both PbSe and PbS MSCs or QDs produced using secondary phosphines growth can occur at reduced temperatures (e.g. less than 0° C.).

The shape of the MSCs and quantum nanostructures prepared by the present method can be spherical. For example, the shape can also be other than spherical or rod shaped, for example, "tablet-shaped" similar to a common pill. The shape can also be ovoid, ellipsoid, nonspheriods (e.g. cubes and other box shapes), caged structures as well (e.g. fullerenes) or have an irregular shape.

EXAMPLE 1

Any suitable source of $Pb^{2+}$ can be used to prepare the disclosed MSC nanoclusters. For example, a source of $Pb^{2+}$ can be obtained from a commercial source, prepared prior to use, or formed in situ. The following includes a non-limiting example of the preparation of a $Pb^{2+}$-dispersant complex: lead oleate.

Lead oxide (0.892 g, 4 mmol), oleic acid (3 mL, 9.5 mmol) and octadecene (12 mL) were charged to a four-neck round-bottomed flask and heated to about 150° C. with efficient stirring under an inert atmosphere for approximately 1 hour. The flask is then allowed to cool to room temperature.

Without further need for isolation or purification, tri-octylphosphine selenide (8 mL of a 1.0 M solution) was injected into the reaction vessel. The flask is left exposed to the atmosphere for approximately 4 hours, during which time a color change from nearly transparent to dark brown was observed. The desired MSC nanoclusters are isolated by adding methanol and butanol to the reaction solution until the MSC nanoclusters form a flocculate. The flocculate is then isolated by centrifugation.

Unreacted oleic acid can be left in the cooled reaction solution.

While the various reaction products can be isolated via centrifugation, other methods can be used to remove components. For example, octadecene has a reported boiling point of approximately 315° C. and can, therefore, be removed under vacuum without co-distilling any excess oleic acid. However, octadecene is a convenient solvent for the preparation of the disclosed quantum nanoparticles, and it is convenient for the formulator to prepare and store the lead oleate in the cooled reaction solution.

Octadecene is compatible with oleic acid, however, other solvents for preparing the $Pb^{2+}$-dispersant complex as described herein above. For example, the formulator can use any convenient solvent having a boiling point compatible with the desired reaction temperature. Decene has a reported temperature of approximately 181° C. and can therefore be used in the preparation of lead oleate 150° C. as described in Example 1.

EXAMPLE 2

Any suitable source of selenium can be used to prepare the disclosed quantum nanoparticles. The selenium reagent can be obtained from a commercial source, prepared prior to use, or formed in situ under some circumstances. The following includes a non-limiting example of the preparation of a source of a suitable source of selenium or suitable selenium reagent: trioctyl phosphine selenide.

Selenium metal (7.86 g, 100 mmol) is added to trioctylphosphine (100 mL) in a glove box under an inert atmosphere. The resulting 1.0 M solution can be used as a stock solution for the preparation of the disclosed quantum nanoparticles.

EXAMPLE 3

The following is an example of the preparation of the disclosed quantum nanoparticles. Lead oleate is prepared as described in Example 1 and transferred to a 50 mL beaker. To this solution is added trioctylphosphine selenide (TOP Se) (8 mL of a 1.0 M stock solution as prepared in Example 2). The reaction solution was allowed to stir at room temperature for 4 hours. A mixture of methanol and butanol was added to the reaction solution until the PbSe quantum nanoparticles separated as a flocculant. The solution is centrifuged and the supernatant is decanted. The separated PbSe quantum nanoparticles were redispersed in tetrachloroethylene and stored until further needed.

EXAMPLE 4

(1-Mercaptoundec-11-yl)tetra(ethylene glycol) (MTPEG) (100 µL) was added to a 20 mM aqueous HEPES buffer solution (500 µL). The aqueous solution contained 100 fold mole excess of MTPEG relative to the PbSe MSC nanoclusters. This solution was added dropwise to a suspension of PbSe MSC nanoclusters in tetrachloroethylene. The mixture was vortexed briefly and centrifuged at 13,000 rpm for 15 minutes. The water soluble MSC nanoclusters were removed by decanting the aqueous layer. If quantitative spectroscopic measurements are to be obtained, $D_2O$ is substituted for $H_2O$ in order to limit solvent absorption in the near-IR region.

Figure 4:
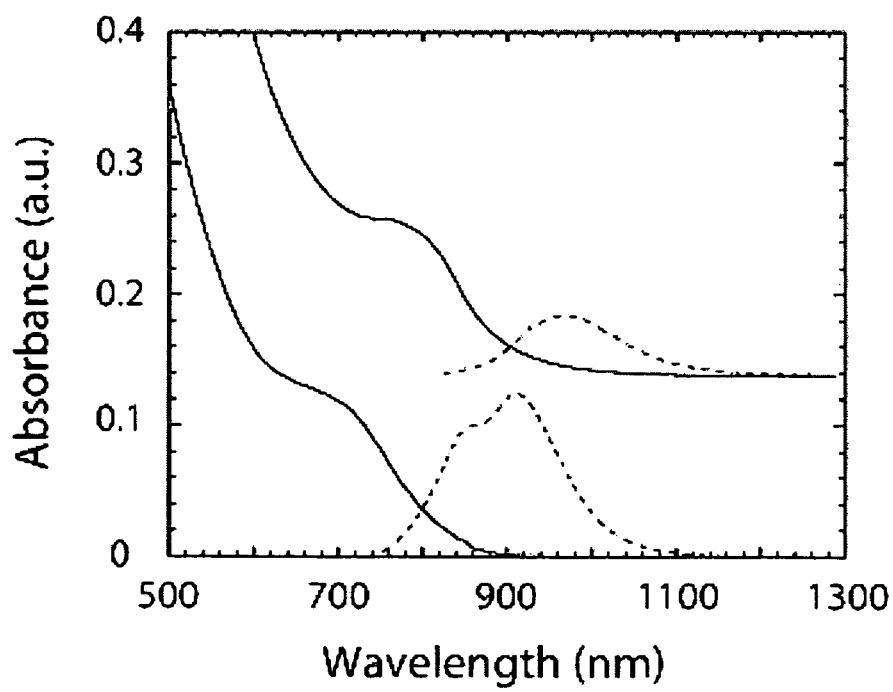
FIG. 4 depicts the absorption (solid) and fluorescence spectra (dashed) of nanoclusters prepared by the disclosed process.
Figure 5:
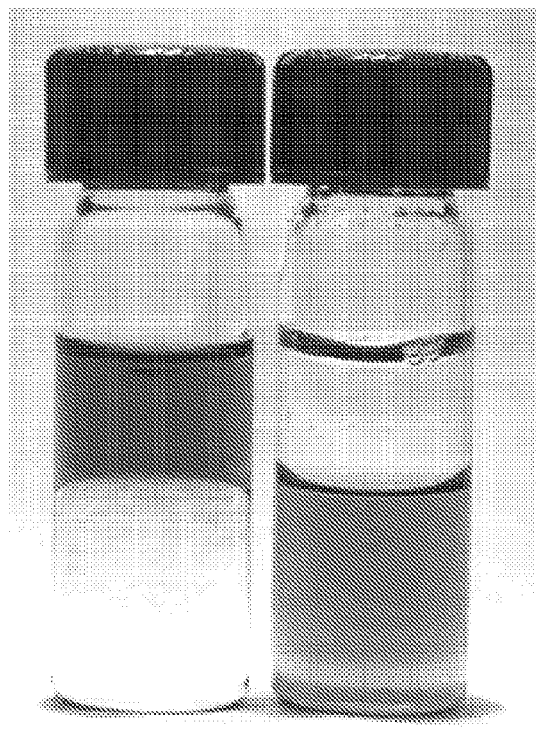
FIG. 5 is as photograph of PbSe magic size nanoclusters prepared according to the disclosed process. The upper phase is organic and the bottom phase aqueous.

FIG. 4 depicts the absorption (solid) and fluorescence spectra (dashed) of MSC nanoclusters prepared by the disclosed process. The lower spectra was obtained from MSC nanoclusters isolated in tetrachloroethylene and the upper spectra represent the absorption and fluorescence of the same MSC nanoclusters isolated in water. As seen in FIG. 4, the absorption and fluorescence spectra are red shifted for the MSC nanoclusters when isolated in water. The emission peak for the MSCs isolated in tetrachloroethylene is 920 nm. FIG. 5 is as photograph of PbSe magic size nanoclusters prepared according to the disclosed process. The sample on the left shows hydrophobic PbSe MSC nanoclusters having an oleic acid passivation layer. The sample on the right shows hydrophilic PbSe MSC nanoclusters having a MTPEG passivation layer. As seen in the photograph, both the hydrophobic top layer in the sample on the left and the hydrophilic bottom layer in the sample on the right, are substantially optically transparent.

Figure 6:
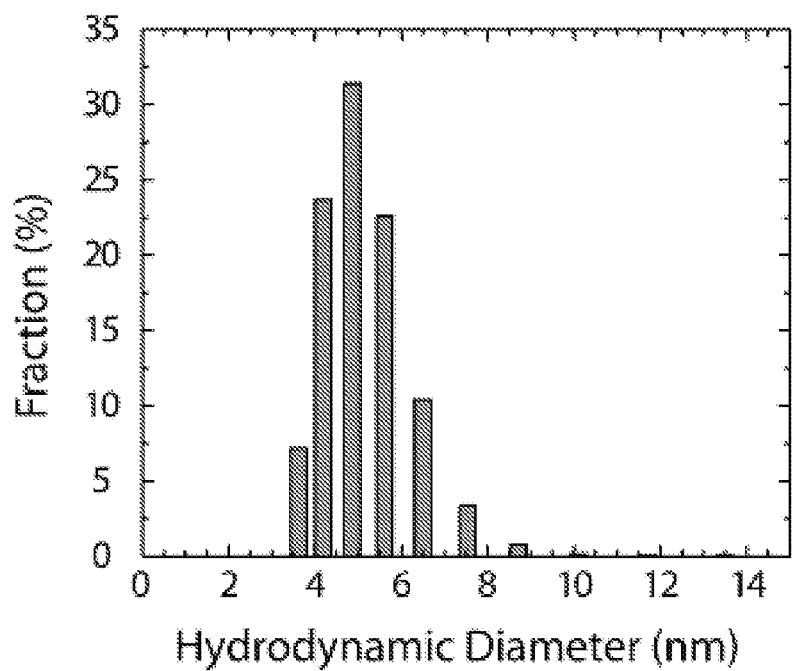
FIG. 6 is a histogram of the hydrodynamic diameter of PbSe magic size nanoclusters prepared according to the disclosed process.
Figure 7:
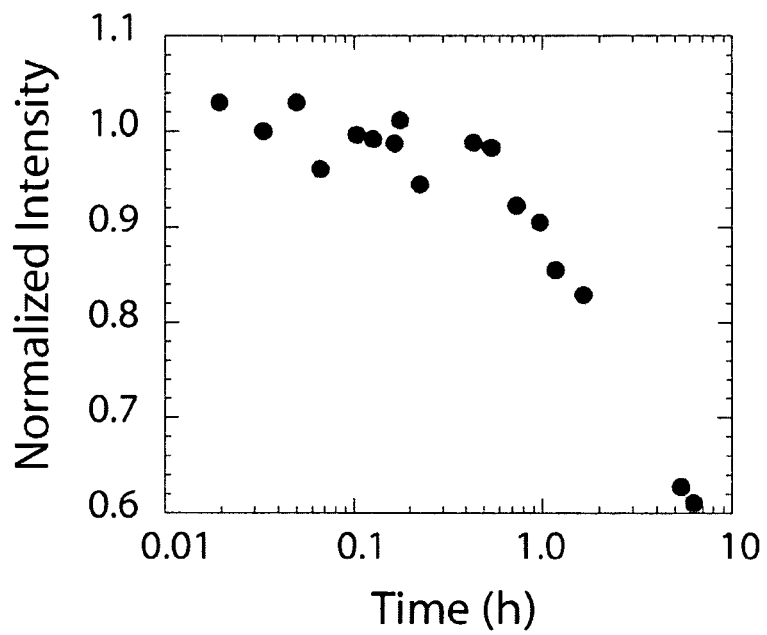
FIG. 7 shows the fluorescence intensity of an aqueous solution of PbSe magic size nanoclusters prepared according to the disclosed process under continuous laser excitation.
Figure 8:
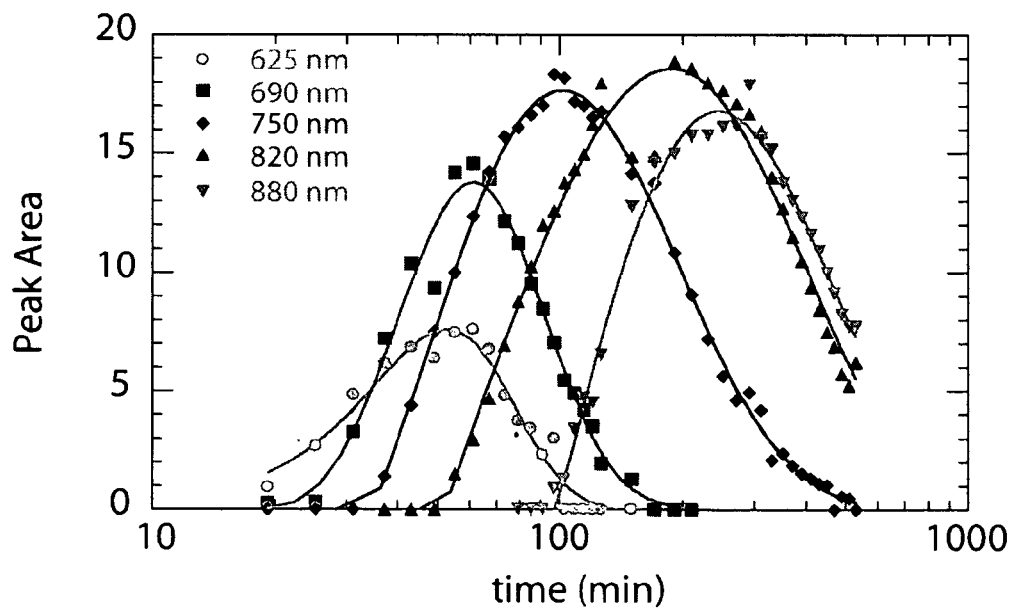
FIG. 8 shows the growing in and decay of 5 clusters during the solution growth process.

FIG. 6 is a histogram of the hydrodynamic diameter of PbSe magic size nanoclusters prepared according to the disclosed process. As seen in FIG. 6, the hydrodynamic diameter is centered about the value 4.8 nanometers. FIG. 7 shows the fluorescence intensity of an aqueous solution of PbSe magic size nanoclusters prepared according to the disclosed process under continuous laser excitation. FIG. 8 shows the growth kinetics of individual PbSe magic size nanoclusters determined by modeling the absorption data in FIG. 1. Individual magic size clusters appear and disappear during the growth process.

Biological Conjugates

The MSCs prepared by the disclosed methods can be used as biological conjugates. In one aspect, the disclosed conjugates comprise:

a) one or more magic size nanoclusters selected from PbS, PbSe, or PbTe having an average particle size of less than or equal to about 2 nm; and b) a biological analyte conjugated thereto.

The disclosed magic size nanoclusters are suitable for use in biological assays, as reporters for biological cellular interactions and as diagnostic tools. For many of the biological applications described herein below, the ligand which is used to prepare the magic size nanoclusters, inter alia, tri-n-octylphosphine selenide, forms the passification layer along with tri-octylphosphine oxide and oleic acid. This layer can be exchanged in order to make the magic size nanocluster water soluble. MSCs prepared by the present invention are soluble in water and biological media (e.g. a buffer).

As described herein above, the disclosed magic size nanoclusters may further comprise a passification layer or coating. The passification layer can be adjusted by the formulator to meet the precise needs of the particular embodiment or use. There are two methods disclosed herein for converting hydrophobic magic size nanoclusters to hydrophilic, water soluble magic size nanoclusters. In the first method, the passification layer that coats and protects the outer layer of the final magic size nanocluster can be exchanged for a ligand or ligands that are more suitable for the intended use or biological target. One method for exchanging the surface ligands is to dissolve the magic size nanoclusters in a suitable solvent that comprises a large excess of the desired ligand, or simply in a solution of the ligand itself if the ligand is a liquid. For exchanging the hydrophobic ligands typically used to prepare the disclosed magic size nanoclusters, the magic size nanocluster is dissolved in a suitable solvent in which the new ligand is not soluble and a second solvent containing the desired hydrophilic ligand in a significantly larger quantity is added. The non-miscible liquids are intimately mixed and the magic size nanoclusters will gradually transfer to the second liquid as the ligand exchange occurs. Dialysis or precipitation-redispersion cycles can be used for purification and removing the excess ligands.

A second method for rendering hydrophobic magic size nanoclusters water soluble relates to a process that allows the original passification layer to remain intact. This can be accomplished by adsorption onto the magic size nanocluster one or more amphiphilic polymers that contain a hydrophobic segment and a hydrophilic segment. Polymers which are suitable for use include polyethylene glycol, alkylamine-modified polyacrylic acid, polyalkyleneoxy-derivatized phospholipids, DL-lactide-co-glycolide-co-polyalkyleneoxy block copolymers, and amphiphilic polyanhydrides. The lipophilic regions of the polymer interact with the lipophilic passification layer thereby extending the hydrophilic region of the polymer outward thereby making the magic size nanocluster water soluble.

Figure 9:
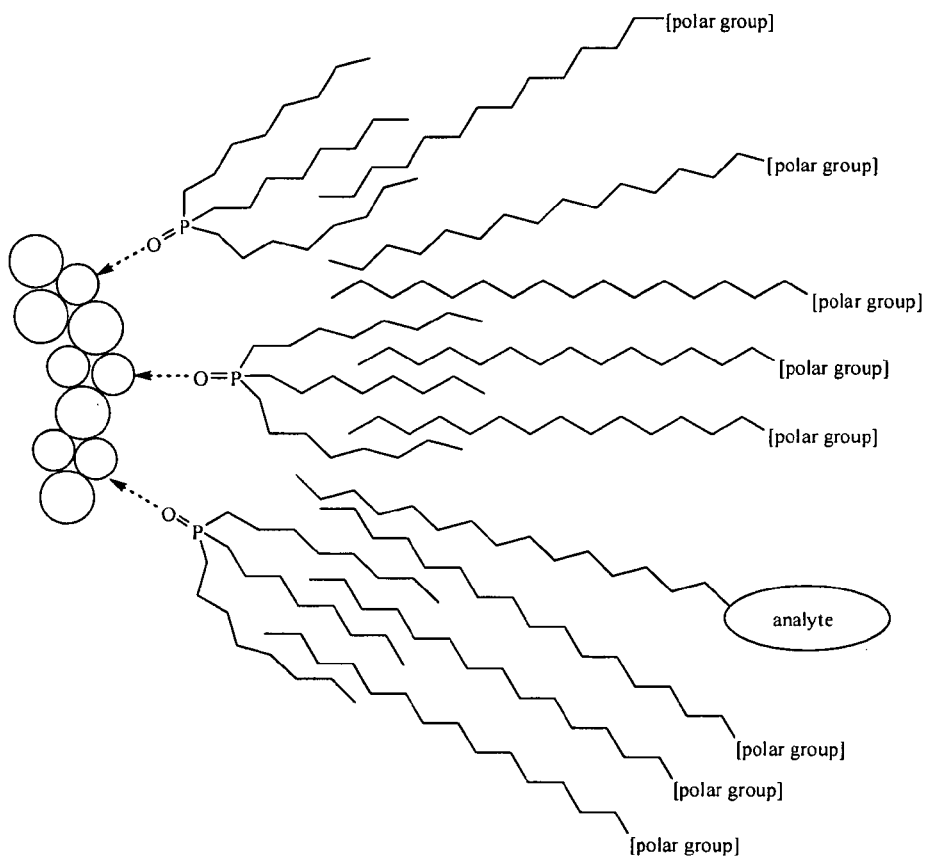
FIG. 9 depicts the conjugation of a biological analyte to the passivation layer of a continuously photoluminescent nanoparticle using a lipid bilayer approach.

The biological analyte conjugated to the magic size nanocluster, can be attached to the hydrophilic end of a polymer that is used to form the water soluble magic size nanocluster. Alternatively, prior to modification of the passification layer, a reactive ligand can be exchanged for a portion of the passification layer and then one end of the reactive ligand can react with the biological analyte to form a linking group. FIG. 9 depicts a passivation layer comprising a hydrophilic polar end group. As can be seen the tether is connected at the terminus of the peptide chain away from the enzyme's active site so as not to interfere with the activity of the enzyme. The length of the tether can be from 5 to 100 nanometers, depending upon the type of analyte and its function.

The magic size nanoclusters can be used as diagnostic screens, for example, as diagnostic assays for cancer. Body fluid, inter alia, blood and urine, are analyzed for the presence of biological markers that indicate the presence of cancerous tissue. The concentration of many of these markers is very low, therefore, the sensitivity of present techniques can miss the presence of a cancer related indicator in many instances. For example, prostate cancer is screened for by measuring the level of prostate-specific antigen. However, many other types of cancers are not yet detected by serum assays. Conjugating one of the disclosed magic size nanoclusters to an antigen specific to a particular type of cancer or tumor cell, allows for the detection of malignancy when the abnormal cells are present in very low concentration and therefore leads to an early detection of the disease.

Whether conjugated to the magic size nanocluster by a direct chemical linker or through affinity, for example, the biological analyte is attached to an amphiphilic material the associates with the passification layer, the continuously photoluminescent magic size nanocluster can be used to track and to monitor the activity of the presence of a biological species.

EXAMPLE 5

Magic size nanoclusters prepared by the disclosed process have hydrophobic surfaces and require appropriate chemical processing to achieve the aqueous solubility for biological applications. MSC nanoclusters prepared according to the disclosed process were made hydrophilic through lipid encapsulation (See Dubertret, B. et al. In Vivo Imaging of Quantum Dots Encapsulated in Phospholipid Micelles, Science 298, 1759 (2002) included herein by reference in its entirety) and direct ligand exchange with 2-aminoethanethiol, mercatoundecanoic acid, and (1-mercaptoundec-11-yl)tetra(ethylene glycol). As discussed above, FIG. 4 depicts the absorption and florescence spectra for PbSe MSC nanoclusters in water. Aqueous solutions of these MSC nanoclusters, when exposed to air, were found to be stable.

In various aspects, the disclosed magic size nanoclusters can be used for the following: probes for determining the presence or function of a biological analyte; a method for continuously tracking the movement of a biological analyte in a cell; as a method for continuously tracking the effect on a biological analyte in a cell when a biological effector is added to the cell; a method for continuously tracking biological interaction of a biological analyte in a cell; a method for continuously tracking the interaction of a biological analyte and a biological effector in a cell; as well as other similar uses and methods.

EXAMPLE 6

Procedure for Synthesizing Colloidal CdSe Quantum Rods
n-Tetradecylphosphonic acid (TDPA, >97%) was purchased from Stem Chemicals. Tributylphosphine (TBP, 97%), trioctylphosphine (TOP, 90%), trioctylphosphine oxide (TOPO, 99%), diphenylphosphine (DPP, 98%), cadmium oxide (>99.99%) and selenium pellets (>99.999%) were purchased from Sigma Aldrich.

A mixture of CdO (0.2062 g, 1.6 mmol), TDPA (0.8924 g, 3.2 mmol) and TOPO (0.6167 g, 1.6 mmol) was heated under vacuum to 200° C. and held for 60 minutes to degas and purify the reactants. The mixture was then heated to 300° C. under moderate nitrogen flow until the solution became clear and colorless. The cadmium solution was then cooled to room temperature, the nitrogen flow was discontinued, and the solution was aged overnight. Selenium (0.0634 g, 0.8 mmol) was dissolved in TBP (0.234 ml, 0.94 mmol) [with 10% volume/final volume DPP (197 µl, 1.1 mmol)] overnight.

Additional TOPO (2.2876 g, 5.92 mmol) was added to the cadmium precursor solution, and this was heated under nitrogen to 310° C. The selenium solution was diluted with TOP (1.743 ml, 4 mmol) and injected rapidly into the hot cadmium precursor. The temperature setpoint was decreased to 250° C. for growth, and heat was applied for 7 minutes. The solution was allowed to cool to 75° C. over approximately 16 minutes after removing the heat. The reaction was quenched by the addition of 20 ml room temperature hexane, and the product was collected in a sample vial.

Figure 10:
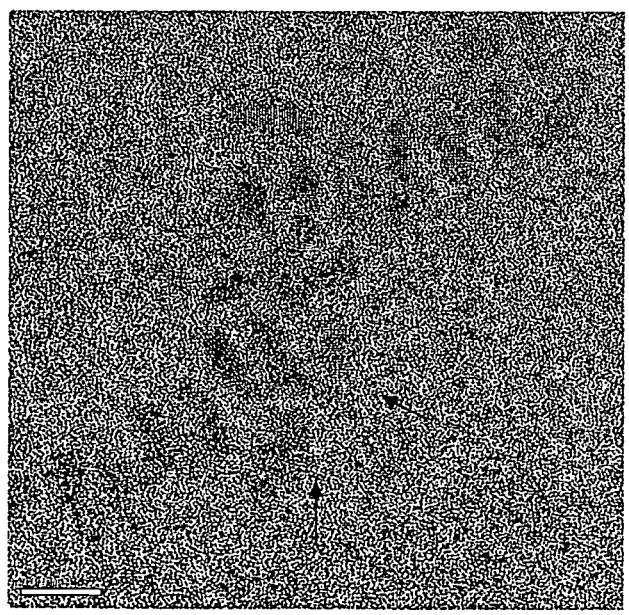
FIG. 10 depicts CdSe quantum rods synthesized using a secondary phosphine. The arrows identify individual quantum rods. The TEM images has a 10 nm scale bar.

A TEM image of the product quantum dots is shown in FIG. 10. The arrows indicate product quantum dots. The scale bar in the lower left-hand corner of the figure denotes 10 nm.

EXAMPLE 7

Example of QD Preparation Using Secondary Phosphine

Figure 11:
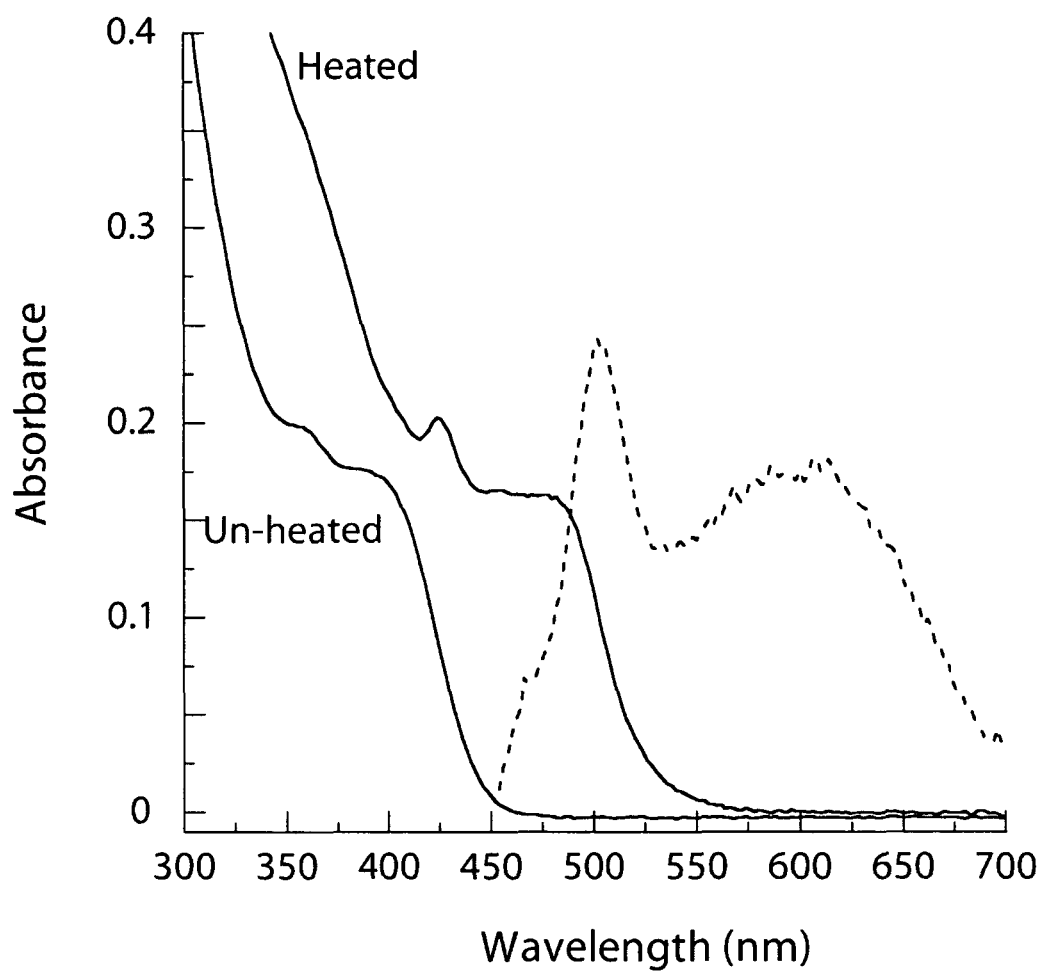
FIG. 11 depicts the absorption spectra for CdSe MSCs/quantum dots produced using secondary phosphine based anion precursors immediately after combination with a cadmium cation source and at a later time after heating. Also, photoluminescence (dashed) from the heated sample is included and represents both broad MSC emission and narrow band-edge QD emission (500 nm).

In a typical reaction, 101 mg Cd(oleate)$_2$ (1.5×10−4 mol) is dissolved in 311 µL of toluene and 189 µL of oleic acid (6×10−4 mol). The oleic acid serves as the passivation layer for the resulting MSCs/QDs and serves as a PGNSS. This solution is combined with 40 mg of diphenylphosphine selenide (DPP) (1.5×10−4 mol) dissolved in 500 µL of toluene. Upon combination at room temperature, the clear solutions turn bright yellow indicating the formation of a CdSe MSC/QD. The absorbance spectrum of the MSCs/QDs formed in this reaction is shown in FIG. 11. The absorbance spectra was measured in a Teflon-sealed 1 mm glass cuvette and allowed for time-dependent growth to be observed in anhydrous conditions. Immediately after combining the DPP=Se and Cd(oleate)$_2$ the absorbance exhibits bands entirely resulting from CdSe MSCs (<~450 nm). Upon heating to 100° C. an absorption band at 500 nm dominates the spectra, indicative of the formation of ~2 nm diameter CdSe QDs.

While particular aspects of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:
1. A composition comprising a plurality of magic-sized clusters (MSCs),
    wherein the cation in each MSC is Pb and the anion in each MSC is S, Se, Te or a combination thereof,
    wherein the MSCs in the composition are present as one or more distinct and monodisperse families of MSCs, such that at least 50% of the MSCs in each family have the same size which lies between 0.5 and 2.0 nm; and
    wherein the emission photoluminescence peak for each monodisperse family has a narrow bandwidth with a wavelength which lies between 550 and 1200 nm.

2. The composition of claim 1, wherein the mode of the distribution of MSC sizes within a family is selected from the group consisting of 0.5, 0.6, 0.7, 0.8, 0.9, 1.0, 1.1, 1.2, 1.3, 1.4, 1.5, 1.6, 1.7, 1.8, and 1.9.

3. The composition of claim 1, wherein the percentage of MSCs in each family having the same size is selected from the group consisting of 50, 60, 70, 75, 80, 90, 95, and 99%.

4. The composition of claim 1, wherein the anion is Se and the composition comprises a family having emission photoluminescence at 920 nm.

5. A process for preparing magic-sized clusters (MSCs), comprising the steps of:
   (a) providing a $Pb^{2+}$ source;
   (b) combining the $Pb^{2+}$ source with an anion source selected from the group consisting of bis(trialkylsilyl) sulfide, bis(triarylsilyl) sulfide, bis(di-alkyl-mono-arylsilyl) sulfide, bis(mono-alkyl-di-arylsilyl) sulfide an organophosphine selenide, and organophosphine telluride; and
   (c) maintaining the combination of (a) and (b) at a temperature of from 20 to 70 °C. for a time sufficient to form the MSCs.

6. The process according to claim 5, further comprising the step of isolating the MSCs after step (c).

7. The process according to claim 5, wherein the $Pb^{2+}$ source comprises a lead carboxylate selected from the group consisting of lead acetate, lead oleate, lead propanoate, lead butanoate, lead pentanoate, lead hexanoate, lead heptanoate, lead octanoate, lead nonanoate, lead decanoate, lead undecanoate, lead dodecanoate, tridecanoate, tetradecanoate, pentadecanoate, lead spalmitoate, lead arachidoate, lead stearate, lead erucate, lead aracidonate, lead linooleate, and lead linoleinate, in a non-coordinating solvent.

8. The method according to claim 6, wherein the non-coordinating solvent is a $C_{10}$-$C_{22}$ saturated or unsaturated, linear or branched hydrocarbon.

9. The process according to claim 5, wherein the $Pb^{2+}$ source comprises a $Pb_{2+}$-dispersant complex, wherein the dispersant is a $C_{12}$-$C_{22}$ carboxylic acid.

10. The process according to claim 5, wherein the anion source is selected from the group consisting of bis(trimethylsilyl)sulfide, tripropylphosphine sulfide, tributylphosphine sulfide, tripentylphosphine sulfide, trihexylphosphine sulfide, triheptylphosphine sulfide, trioctylphosphine sulfide, tripropylphosphine selenide, tributylphosphine selenide, tripentylphosphine selenide, trihexylphosphine selenide, triheptylphosphine selenide, trioctylphosphine selenide, tripropylphosphine telluride, tributylphosphine telluride, tripentylphosphine telluride, trihexylphosphine telluride, triheptylphosphine telluride, trioctylphosphine telluride and combinations thereof.

11. The process according to claim 5, wherein the temperature in step (c) is selected from the group consisting of from 20° C. to 70° C., 20° C. to 60° C., 20° C. to 50° C., 20° C. to 40° C., and 20° C. to 30° C.

12. A process for preparing magic-sized clusters (MSCs) and/or quantum nanostructures comprising the steps of:
   (a) providing a cation source selected from the group consisting of Pb, Sn, Ge, Si, Cd, Zn, Mg, Hg, Al, Ga, In, and Tl;
   (b) providing a composition comprising an anion source, said anion source comprising a secondary phosphine compound and/or a secondary phosphine chalcogenide compound, wherein the secondary phosphine compound and/or secondary phosphine chalcogenide compound make up at least 15 percent of the total anion sources in the composition;
   (c) combining (a) and (b); and
   (d) maintaining (c) at a temperature and time sufficient to form the MSCs and/or quantum nanostructures.

13. The process according to claim 12, further comprising the step of isolating the MSCs from step (c).

14. The process according to claim 12, wherein the anion source is selected from the group consisting of secondary phosphine selenide, secondary phosphine sulfide, secondary phosphine telluride, and combinations thereof, and wherein the secondary phosphine chalcogenide makes up at least 15% of the anion sources.

15. The process according to claim 12, wherein the cation source comprises a lead carboxylate selected from the group consisting of lead acetate, lead oleate, lead propanoate, lead butanoate, lead pentanoate, lead hexanoate, lead heptanoate, lead octanoate, lead nonanoate, lead decanoate, lead undecanoate, lead dodecanoate, lead tridecanoate, lead tetradecanoate, lead pentadecanoate, lead spalmitoate, lead arachidoate, lead stearate, lead erucate, lead aracidonate, lead linooleate, lead linoleinate, lead acetylacetonate, lead bromide, lead chloride, lead fluoride, lead oxide, lead sulfate, and lead nitrate in a non-coordinating solvent.

16. ginal) The method according to claim 12, wherein the non-coordinating solvent is a $C_{10}$-$C_{22}$ saturated or unsaturated, linear or branched hydrocarbon.

17. The process according to claim 12, wherein the cation source comprises a cadmium compound selected from the group consisting of cadmium acetate, cadmium oleate, cadmium propanoate, cadmium butanoate, cadmium pentanoate, cadmium hexanoate, cadmium heptanoate, cadmium octanoate, cadmium nonanoate, cadmium decanoate, cadmium undecanoate, cadmium dodecanoate, cadmium tridecanoate, cadmium tetradecanoate, cadmium pentadecanoate, cadmium spalmitoate, cadmium arachidoate, cadmium stearate, cadmium erucate, cadmium aracidonate, cadmium linooleate, cadmium linoleinate, cadmium acetylacetonate, cadmium bromide, cadmium chloride, cadmium fluoride, cadmium oxide, dimethylcadmium, cadmium sulfate, and cadmium nitrate in a non-coordinating solvent.

18. The process according to claim 12, wherein the cation source comprises a $Pb_{2+}$-dispersant complex, wherein the dispersant is a $C_{12}$-$C_{22}$ carboxylic acid.

19. The process according to claim 12, wherein the secondary phosphine compound is selected from the group consisting of is selected from the group consisting of bis(3,5-bis(trimethylsilyl)phenyl)phosphine, bis(4-chlorophenyl)phosphine, bis(3,5-di-tert-butylphenyl)phosphine, bis(3,5-ditrifluoromethylphenyl)phosphine, bis(2-furyl)phosphine, bis(4-methylphenyl)phosphine, 1,2-bis(phenylphosphino)ethane, 1,3-bis(phenylphosphino)propane, bis(4-trifluoromethylphenyl)phosphine, bis(3,4,5-trimethoxyphenyl)phosphine, bis(2,4,6-trimethylphenyl)phosphine, dibenzylphosphine, di-n-butylphosphine, di-tert-butylphosphine, dicyclohexylphosphine, diisobutylphosphine, diisopropylphosphine, diphenylphosphine, phobane, di-2-norbornylphosphine, diethylphosphine, dicyclopentylphosphine, dicyclohexylphosphine, di-t-butylphosphine, di-n-propylphosphine, di-1-adamantylphosphine, 1,3-bis(isopropylphosphino)propane, bis(3,5-dimethylphenyl)phosphine, di-n-octylphosphine, di-n-hexylphosphine, di-n-heptylphosphine, and di-n-propylphosphine.

20. The process according to claim 12, wherein the percentage of secondary phosphine compound and/or secondary phosphine chalcogenide is selected from the group consisting of 20, 25, 50, 75, 80, 90, and 95%.

* * * * *